United States Patent [19]

Fantasia

[11] Patent Number: 5,000,416
[45] Date of Patent: Mar. 19, 1991

[54] ALIGNMENT POSITIONING MECHANISM

[75] Inventor: Peter M. Fantasia, Houston, Tex.

[73] Assignee: The United States of America as represented by the Administrator of the National Aeronautics and Space Administration, Washington, D.C.

[21] Appl. No.: 470,663

[22] Filed: Jan. 26, 1990

[51] Int. Cl.[5] .......................................... F16M 13/00
[52] U.S. Cl. ................................... 248/650; 248/677; 248/181; 254/101; 254/DIG. 4; 403/131
[58] Field of Search ............... 248/649, 650, 663, 677, 248/673, 405, 181, 188.4, 288.3, 354.1; 403/131; 254/101, DIG. 4; 52/126.1, 126.2, 126.3, 126.4, 126.5, 126.6

[56] References Cited

U.S. PATENT DOCUMENTS

| | | | |
|---|---|---|---|
| 331,460 | 12/1885 | Suckow | 254/101 |
| 1,102,792 | 7/1914 | Patton | 254/101 |
| 1,507,840 | 9/1924 | Landgraf | 403/131 |
| 1,572,856 | 2/1926 | Watson | 254/101 |
| 2,731,863 | 1/1956 | Bellows | 248/181 |
| 2,911,169 | 11/1959 | Contreras | 248/649 |
| 2,933,309 | 4/1960 | Heiss | 403/131 |
| 2,940,297 | 6/1960 | Mayer | 248/650 |
| 2,996,308 | 8/1961 | Cislo | 403/131 |
| 3,239,169 | 3/1966 | Sloyan | 248/23 |
| 3,361,410 | 1/1968 | Messer | 248/188.4 |
| 3,815,852 | 6/1974 | May | 248/677 |
| 4,061,298 | 12/1977 | Kober | 248/23 |
| 4,632,356 | 12/1986 | Munz | 248/638 |
| 4,690,365 | 9/1987 | Miller et al. | 248/650 |

Primary Examiner—Ramon O. Ramirez
Assistant Examiner—Robert A. Olson
Attorney, Agent, or Firm—Russell E. Schlorff; Harold W. Adams; Edward K. Fein

[57] ABSTRACT

An alignment positioning mechanism for correcting and compensating for misalignment of structures to be coupled thereby. The mechanism comprises a power screw 12 with a base portion 13 and a threaded shank portion 14. A mounting fixture 18 is provided for rigidly coupling said base portion to the mounting interface of a supporting structure with the axis of the screw perpendicular thereto. A traveling ball nut 40 threaded on the power screw 12 is formed with an external annular arcuate surface 41 configured in the form of a spherical segment and enclosed by a ball nut housing 50 with a conforming arcuate surface 51 for permitting gimballed motion thereon. The ball nut housing 50 is provided with a mounting surface 53a which is positionable in cooperable engagement with the mounting interface of a primary structure to be coupled to said supporting structure. Cooperative means (66,70) are provided on the ball nut 40 and ball nut housing 50, respectively, for positioning the ball nut and ball nut housing in relative gimballed position within a predetermined range of relative angular relationship whereby severe structural stresses due to unequal loadings and undesirable bending moments on said mechanism are avoided.

10 Claims, 4 Drawing Sheets

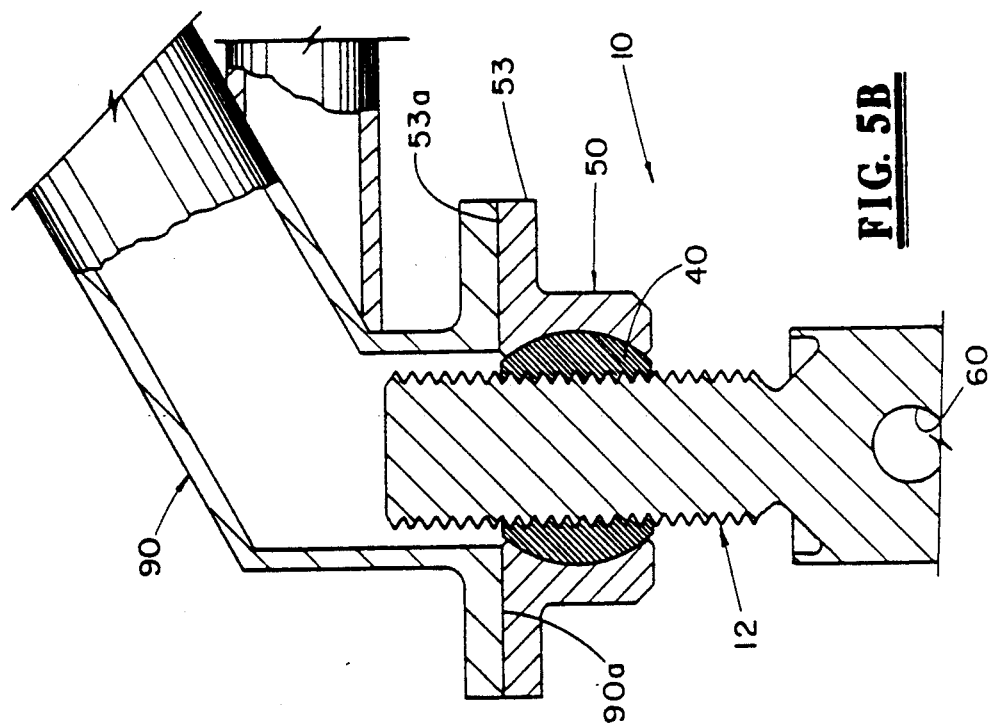
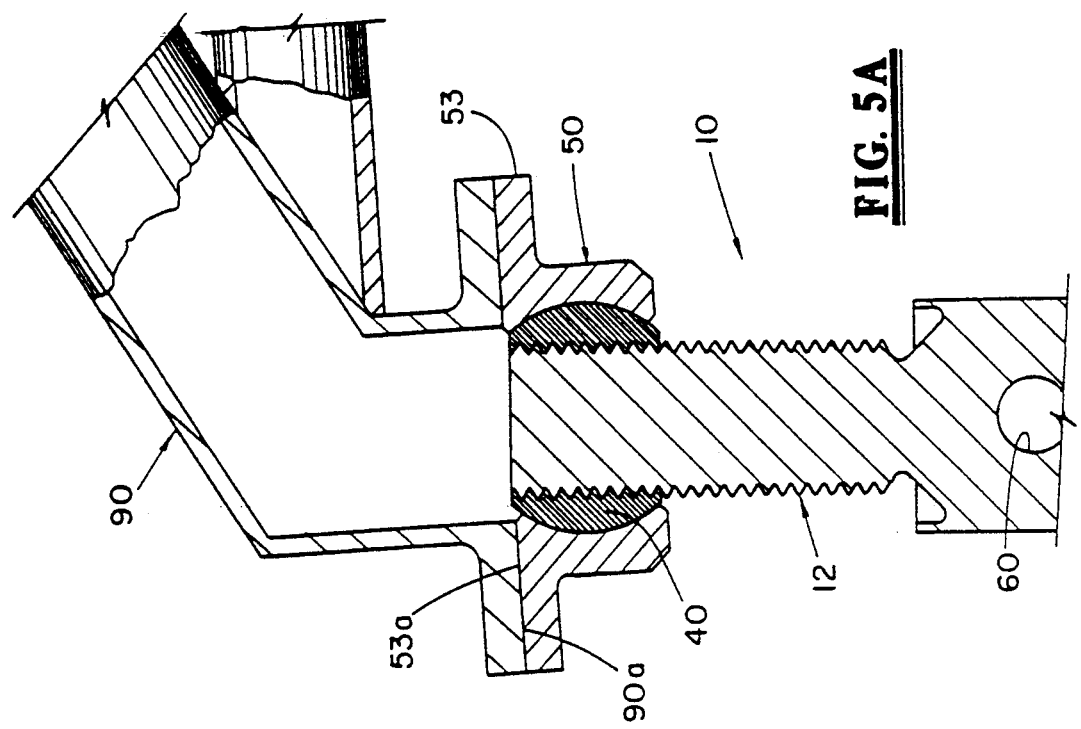

ALIGNMENT POSITIONING MECHANISM

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates to alignment positioning mechanisms, and more particularly to a mechanism for correcting or compensating for the misalignment or misplacement of a structure's interface with a mounting surface.

BACKGROUND ART

A variety of means have heretofore been devised for correcting and compensating for misalignment and misplacement errors in the mounting of structures to a support surface. Such errors, which can produce undesirable stresses in the mounting mechanisms and the structures themselves, frequently arise in the mounting of structures which have a plurality of "legs", since such "legs" may be of unequal length as well as being oriented at angles to the mounting surface which are other than desired. With metallic structures, aside from errors in critical manufacturing measurements and specifications, the problem is sometimes caused by warpage resulting from welding during fabrication. In other instances aside from stress problems, it may be necessary to adjust the overall height of the structure which is mounted.

Some of the previous methods which have been used to correct misalignment and misposition problems include the use of multiple spacers, multiple shims, and screw jacks. In general, however, these methods are useful in only the simple problem cases. In more complex situations, such as in the mounting of structures having multiple "legs" or attachment points, these previous methods are oftentimes inadequate, very difficult, time consuming, and sometimes very costly.

The use of shims and spacers is usually a "trial and error" method requiring multiple, repetitive measurements to come close to eliminating misalignment or misposition of the "legs". In some cases these shims and spacers can be difficult to permanently fix in a desired position. If the problem is severe enough, the use of shims and spacers could induce loading problems on the apparatus used to fasten the "legs" to the mounting surface. On the other hand, the use of jacks is mostly sufficient for situations where the problems arise only from the differences in the lengths of the "legs". However, should there be any angular misalignment in the "legs", such misalignment will result in instability of the screw jack as well as induce a bending moment on the jack.

In the prior art, U.S. Pat. No. 4,690,265 discloses a clamping device for setting a detail to a fixture base. The device includes a clamping means comprising spring washers and a clamp nut disposed about the upper threaded end portion of an elongate member which is provided with a flange intermediate the threaded portions whereby the clamping means is adapted to clamp a structure to be mounted against the flange. The device provides for single load line jacking but lacks precision alignment and positioning capability because of its reliance on the deformation and oversizing of parts.

U.S. Pat. No. 4,061,298 discloses an aligning device for a machine in which a support body for a machine pedestal is guided in a threaded portion of a base member. The support body and a central tension rod are interconnected through an entrainment device. The support body can be vertically adjusted to raise the machine. This device requires access to the top of the mechanism during adjustment and cannot be readily adjusted after clamping to the object to be mounted.

U.S. Pat. No. 3,239,169 discloses a motor support which is vertically adjustable and includes a threaded vertical post and screw mechanism. The motor support does not provide for angular adjustment and has no means to prevent backdrive of the screw mechanism.

U.S. Pat. No. 4,632,356 discloses a vertically adjustable mounting device with a threaded spindle, but does not provide for angular alignment or adjustment means.

SUMMARY OF THE INVENTION

The invention is an alignment positioning mechanism which is adapted for rigidly coupling a primary structure to a supporting structure whereby relative misalignment and mispositioning of the mounting interfaces of said structures can be corrected or compensated for to alleviate structural stress which might arise from unequal loadings in the coupling of said structures and to avoid instability and bending moments in the mechanism itself. The mechanism comprises a power screw having an externally threaded shank portion and a base portion. A mounting fixture attached to said base portion provides means for rigidly coupling the base of the screw member to the mounting surface of a support structure with the longitudinal axis of the screw member in perpendicular relationship to the mounting interface of the support structure. A ball nut is threadedly mounted on the threaded shank of the screw member for adjustable positioning thereon. The ball nut is provided with an external annular surface in the form of a spherical segment with a center of curvature coincident with the screw member axis. A ball nut housing having an inner annular surface conforming in configuration with the external surface of the ball nut encloses the ball nut and is adapted for gimbal-like motion on the ball nut. Fastening means are provided on the ball nut housing for accommodating its rigid connection to the mounting interface of the primary structure throughout a predetermined range of angular relationships between the mounting interfaces of the primary structure and the supporting structure and a corresponding range of relative gimbal positions of the ball nut and ball nut housing. Cooperative locking means on the ball nut and ball nut housing are provided for locking the ball nut housing to the ball nut in a selected gimbal position thereon as controlled by the angular relationship of said mounting interfaces.

BRIEF DESCRIPTION OF THE DRAWINGS

FIGS. 5A and 5B are schematic diagrams for showing the configuration and arrangement of the invention when mounting structures with different angular orientations.

DETAILED DESCRIPTION OF THE INVENTION

Figure 1:
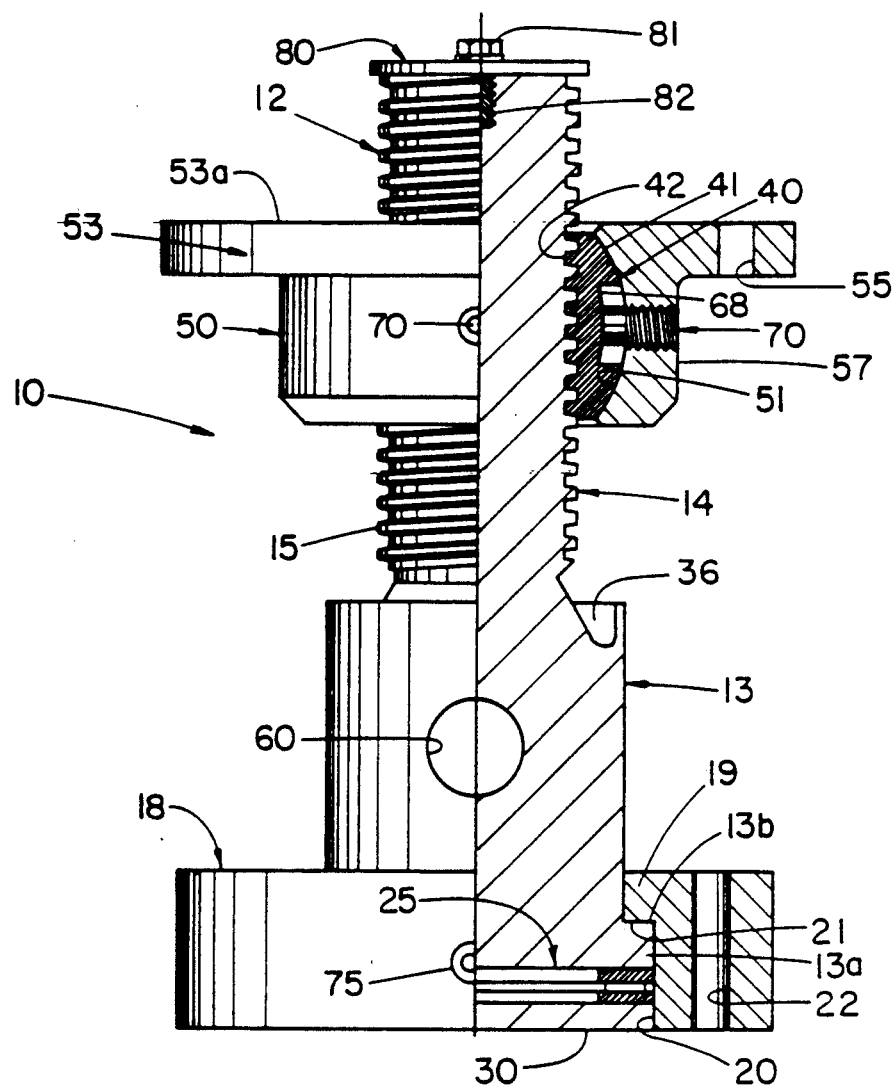
FIG. 1 is a plan view, partly in section, of the alignment positioning mechanism of the invention.

Referring more particularly to the drawings, there is shown in FIG. 1 an alignment positioning mechanism 10 which represents a preferred embodiment of the invention. The mechanism 10 comprises an elongate power screw 12 which is adapted to provide the vertical translation for the mechanism. The power screw 12 has a lower cylindrical base portion 13 and an upper threaded portion 14 provided with Acme threads 15. The lower base portion 13 is of larger diameter than the upper threaded portion which extends for more than half the length of the screw. The base portion 13, at its lower end, is provided with an external annular flange 13a which provides an upward facing shoulder 13b for accommodating an annular mounting fixture 18.

The mounting fixture 18 is provided at one end with an internal annular flange 19 which extends inwardly from the inner cylindrical wall 20 of the fixture and provides a downward facing shoulder 21 formed thereby which is adapted to seat on the annular shoulder 13b of the power screw base portion 13. The fixture 18 is also provided with a plurality of bolt holes 22 which extend in the axial direction of the fixture 18 and are arranged in equiangular spacing for accommodating a bolted connection of the mechanism 10 to a support structure.

The power screw 12 is seated at its lower end on a bearing assembly 25 which comprises an annular thrust needle bearing 26 which is disposed between a pair of annular thrust washers 27,28 disposed on opposite sides thereof for protecting the needle bearings. The bearing assembly 25 is retained in position by a circular retention plate 30. The retention plate 30 is provided with four radially extending ears 31, each of which includes a bolt hole 32 extending through the ear whereby the retention plate may be bolted to the mounting fixture 18. For accommodating the ears 31 of the retention plate 30, the mounting fixture is provided with internal recesses 33 which are formed in its lower end surface 34 and its inner wall 20. A blind threaded bore is formed in the base of each recess 33 for receiving bolts for retaining the retention plate. When bolted to the mounting fixture 18, the retention plate 30 also prevents any lubricant from the bearing assembly 25 from coming into contact with the mounting surface of a support structure.

An annular groove or recess 36 is formed in the upper end surface of the base portion 13 just below the Acme threads 15 of the threaded portion 14. The recess 36 opens upwardly and is disposed to capture any excess lubricant which should drip or migrate downwardly along the threads 15 of the power screw 12.

On the upper threaded end portion of the power screw 12, there is disposed a travelling nut or alignment ball 40, which is provided with an external annular surface 41. The alignment ball 40 is of annular shape and formed with an internal threaded bore 42 extending therethrough, the bore wall being provided with threads for cooperative engagement with the Acme threads 15. The external surface 41 of the alignment ball 40 is a segment of a spherical surface which has a center of curvature coincident with the longitudinal axis of the screw 12.

Figure 2:
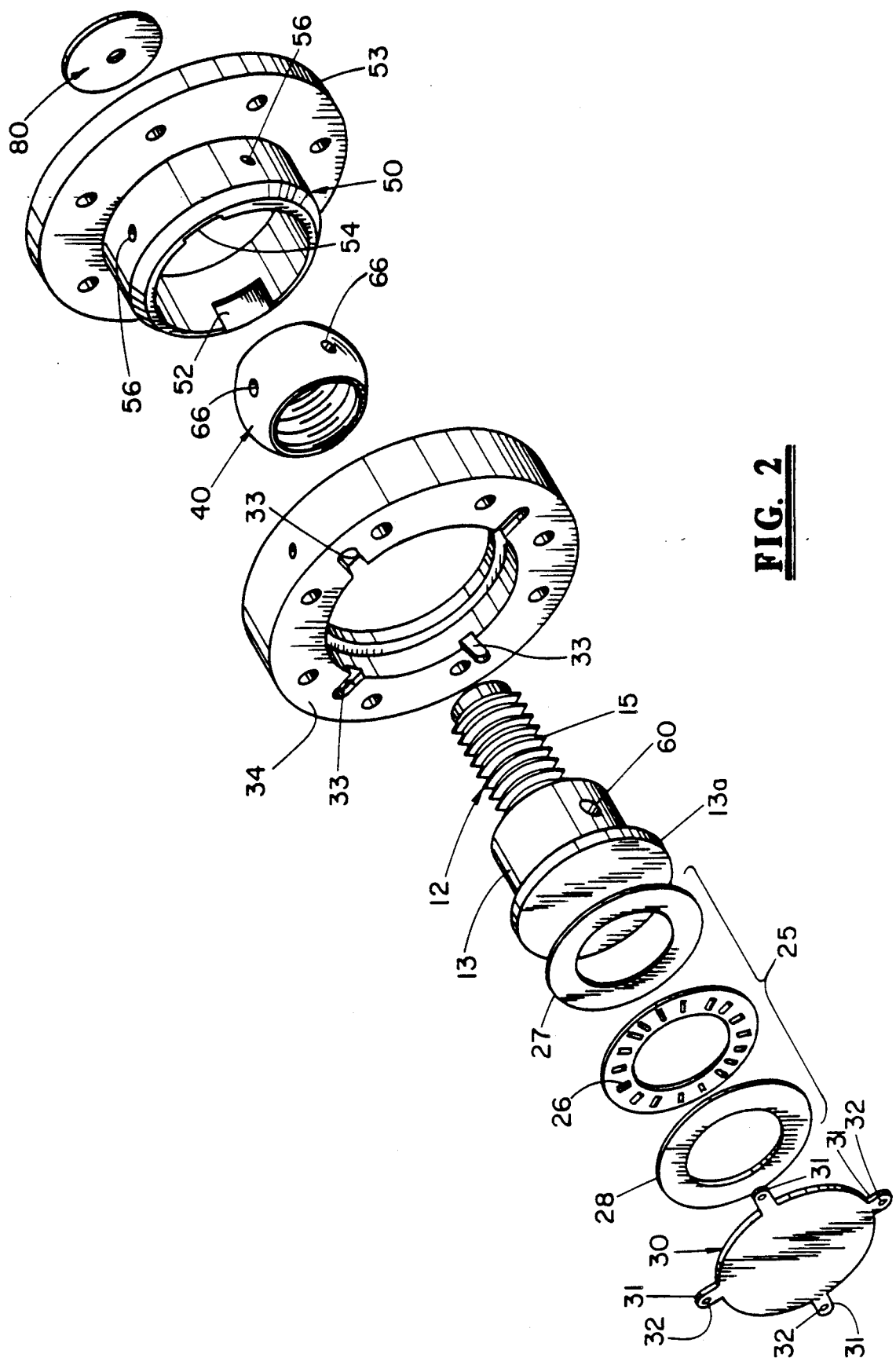
FIG. 2 is an exploded view in perspective of the mechanism FIG. 1.

An alignment ball housing 50 is provided for the alignment ball 40 and serves as an outer race for the ball 40. The ball housing 50 is of annular shape with an internal annular curved surface 51 conforming in configuration to the segmental spherical surface 41 of the ball 40. In the assembly of the mechanism 10, the ball housing 50 encloses the alignment ball 40 which is disposed in the central opening of the housing 50 with the ball surface 41 in conforming engagement with the inner annular surface 51 of the housing 50. The housing 50 is therefore adapted for a gimbal motion on the ball 40 when the curved surfaces 41,51 move in relative sliding arcuate movement. For ease of assembly, the internal annular surface 51 of the ball housing 50 is provided with a pair of diametrically opposed axially extending slots 52,54 as shown in FIG. 2. The slots 52,54 are each of a width slightly larger than the height of the ball 40 and of sufficient length whereby the ball 40 may be inserted therethrough into the housing 50 and then turned 90° so that the curved surfaces 41,51 are in conforming engagement.

The annular ball housing 50 is provided about its periphery with an external annular flange 53 having a plurality of bolt holes 55 which extend through the flange 53 in an axial direction therethrough and are arranged in equiangular spacing about the central axis of the annular housing 50. The bolt holes 55 permit the bolting of the mechanism 10 to a primary structure, the positioning and alignment of which with respect to a support structure is desired to be accomplished. The alignment ball housing 50, therefore, serves as the mounting interface between the mechanism 10 and the primary structure to which it mounts.

Figure 4:
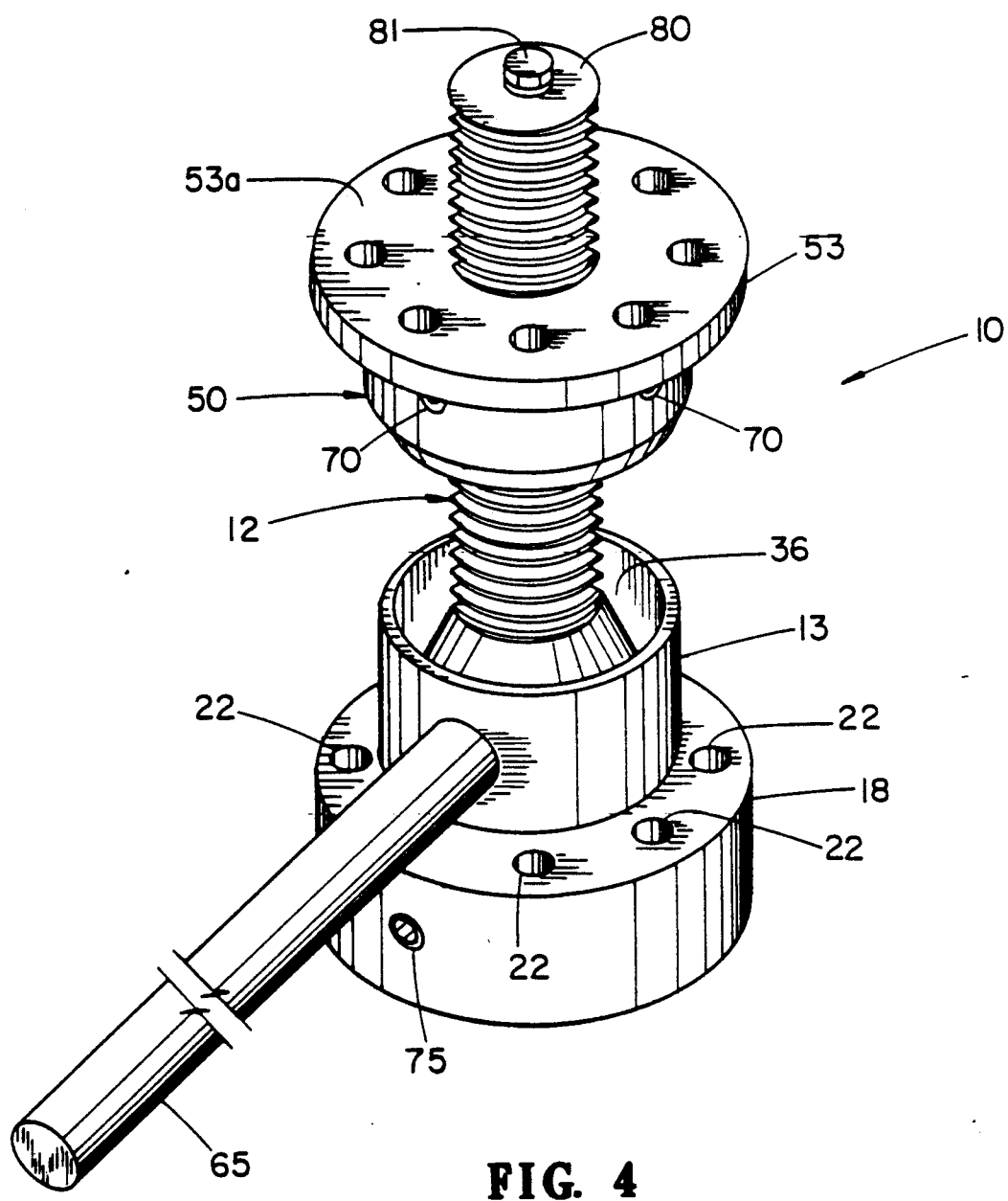
FIG. 4 is a perspective view of the assembled mechanism of the invention.

When the ball housing 50 is bolted to a primary structure, it will be seen that the alignment ball 40 will travel on the threads 15 of the power screw 12 if the screw 12 is imparted with rotation about its longitudinal axis. For this purpose, the base portion 13 of the screw 12 is provided with a radial bore 60, which preferably extends completely through the base 13 and is adapted for accommodating a torque bar 65, as shown in FIG. 4, whereby the power screw 12 may be rotated about its axis.

For limiting and controlling the gimbal motion of the ball housing 50 on the alignment ball 40, the curved surface 41 of the ball 40 is provided with four dumb-bell shaped slots 66 or 66a, each of which is symmetrical with respect to the mid-point of the surface 41 with the long axis of the slot disposed in the direction of the central axis of the ball 40. The slots 66 are identical in configuration and are cut into the surface 41 in equiangular 90° spacing. The bottom surface 68 of each slot 66 is also an arcuate spherically curved surface with a center of curvature coincident with that of the external surface 41.

The alignment ball housing 50 is provided with four screws holes 56 which extend radially inward from the outer cylindrical surface 57 of the housing 50 to its inner curved surface 51. The screw holes 56 are arranged in equiangular 90° spacing in registry with the slots 66 in the ball 40. Each of the screw holes 56 is internally threaded for accommodating a guide screw 70 which is adapted to be threaded therein to where the tip of the screw is adjacent to the bottom surface 68 of a slot 66 just short of coming to a hard stop on the ball. The screws 70 and walls of the slot 66 act as restraints which limit the ball housing tilt within a prescribed range.

It will therefore be seen that the alignment positioning mechanism 10 is adapted for connection between a structure to be mounted, hereinafter referred to as a primary structure and a supporting structure. For mounting the two structures, it is only necessary to bolt the flange 53 of the ball housing 50 to the primary structure and to bolt the fixture 18 to the support structure. The ball housing 50 can be positioned for mounting by accomplishing an axial rotation of the power screw 12 by means of the torque bar 65 which will cause the ball 50 to travel on the threads 50 in either direction with respect to the base of the screw 12 and thereby raise or lower the ball housing as necessary. To accommodate the power screw 12, the primary structure to be mounted must be provided with an opening in its mounting interface which will suitably accommodate any extension of the screw 12 beyond the end surface 53a of the ball housing flange 53. In establishing the connection between the primary structure and the supporting structure, the ball housing flange 53 should be first attached to the payload structure, with the housing 50 gimballed as necessary on the ball 40 to accommodate any misorientation or undesired angular orientation of the two structures with respect to their mounting surfaces. The screws 70 on the ball housing 50 are then set to where the tips of the screws are positioned adjacent to the slot surfaces 68 of the ball 40 and to where the ball housing 50 is fastened to the ball 40 and restrained in limited tilting movement thereon as controlled by the dimensions of the slots 66.

Figure 3:
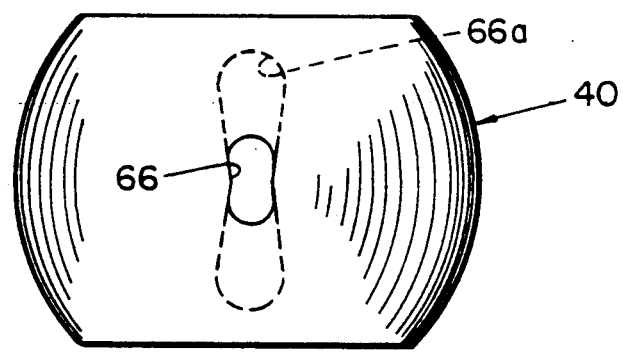
FIG. 3 is a side view of the alignment ball which is a part of the mechanism of FIG. 1.

If the alignment positioning mechanism 10 is likely to be used to adjust small errors in angularity with a small range of 2° or less, the slots 66 in the ball surface 41 are preferably of small size. Whereas if large errors in angularity are to be corrected, such as ±15°, much larger slots 66a, such as shown in dashed lines in FIG. 3, must be provided. The shape of the slot allows the ball housing 50 to tilt in any direction within a prescribed range but not to rotate about its longitudinal axis.

To insure that the power screw 12 will not backdrive, a set screw 75 is provided which is adapted to be threaded through a threaded hole in the wall of the mounting fixture 18 to clamp against the cylindrical wall 13a of the base portion 13. Also, to insure that the alignment ball 40 is retained on the power screw 12 at all times, a retention plate 80 is clamped to the upper end of the power screw 12 by a threaded screw 81 which extends through a central opening in the plate 80 into a threaded bore 82 provided in the end of the power screw 12. The retention plate 80 is sufficiently large in diameter to overhang the screw 12 about its radial extremity whereby the ball nut 40 cannot travel past the end of the power screw 12.

In FIGS. 5A and 5B there are shown in fragmentary views, different applications of the mechanism 10 wherein the mounting interface 90a of a primary structure 90 to be mounted is at different angular relationships to a supporting surface (not shown) which is fixed in perpendicular relation to the axis of the power screw 12. The two views, FIGS. 5A and 5B, could represent an application of the invention wherein two mechanisms 10 are used for coupling two different legs of a primary structure, each of which is misaligned with different angular orientations with respect to the power screw and a supporting surface. By use of the invention, severe stresses in the connecting structures which might otherwise result from unequal loading because of the misaligned "legs" of the power screws are avoided.

In a particular embodiment of the invention which has been constructed, the mechanism 10 was fabricated primarily of AISI 1025 steel with the exception of the bearing assembly, the set screws, the alignment ball, and the power screw. The power screw was composed of AISI 1040 steel for additional strength. The torque bar and alignment ball was composed of stainless steel for strength and hardness. The mechanism was capable of supporting a load in excess of 7500 lbs and provided with ball slots 66 to allow it to gimbal ±2°. The screw length was such as to allow a vertical travel of ±1.5 inches for the ball 40 from its nominal middle position on the threads 15.

It will therefore be seen that with alterations in these dimensions and materials the mechanism 10 can be applied to almost any loading case conceived with the torque and the torque bar length being the only constraints on such a device. It is therefore a versatile device which can be used in almost any situation. The mechanism 10 can correct for the misalignment or misplacement of a structure caused by the structure's "legs" being unequal in length or not individually perpendicular to the common mounting surface, and has the capability to be adjusted at any time with little effort. The alignment and position of the mechanism 10 can be fixed with no chance of alterations without backing off the set screw 75 in the base of the mechanism. The gimbal action of the alignment ball prevents the mechanism from experiencing bending moments. Basically, the alignment positioning mechanism of the invention has all the advantageous attributes of shims, spacers, and screw jacks minus all their disadvantages and is easily capable of handling any complex misalignment and/or misplacement problem concerning structures with multiple legs.

It is also to be understood that the foregoing description of a preferred embodiment of the invention has been presented for purposes of illustration and explanation and is not intended to limit the invention to the precise form disclosed. It is to be appreciated therefore, that various material and structural changes may be made by those skilled in the art without departing from the spirit of the invention.

I claim:

1. An alignment positioning mechanism for use in mounting a primary structure to another supporting structure and for correcting and compensating for relative misalignment and mispositioning of their mounting interfaces, said mechanism comprising:

an elongate screw member having a base portion and an externally threaded shank portion;

mounting means for rigidly coupling the base portion of the screw member to the mounting surface of a supporting structure with the longitudinal axis of said screw member in perpendicular relationship to the mounting interface of said supporting structure;

a ball nut member threadedly mounted on the threaded shank portion of said screw member whereby said ball nut member is adjustably positionable along the length of said threaded shank portion, said ball nut member having an external annular arcuate surface configured in the form of a segment of a spherical surface with the center of curvature of said surface coincident with the longitudinal axis of said screw member;

an annular ball nut housing having an inner annular surface of conforming configuration with the external annular surface of said ball nut, said ball nut housing enclosing said ball nut with its inner annular surface in conforming engagement with the external surface of said ball nut in arcuately slideable relationship therewith whereby said nut housing is adapted for gimbal-like motion on said ball nut;

fastening means on said ball nut housing for rigidly fixing said housing to the mounting interface of a primary structure to be mounted to said support structure, said housing being gimballed on said ball nut to a position of relative inclination therewith which accommodates its connection to said mounting surface of the primary structure wherein said primary structure mounting surface is disposed in a predetermined range of angular relationships to the mounting surface of said supporting structure;

cooperative means on said ball nut and said ball nut housing for positioning said ball nut housing on said ball nut in a gimballed relative position within said predetermined range; and means for imparting axial rotation to said screw member whereby said ball nut may be adjustably positioned along the threaded shank portion of said screw to accommodate engagement of said ball nut housing with said primary structure.

2. An alignment positioning mechanism as set forth in claim 1 wherein said cooperative means comprises a plurality of slots formed in the external spherical surface of the ball nut and a plurality of guide screws mounted on said ball nut housing in registry with said slots for threaded movement in the direction of said slots whereby said guide screws are insertable into said slots to restrain said ball nut and ball nut housing in a selected angular relationship within a predetermined range.

3. An alignment positioning mechanism as set forth in claim 1 wherein said externally threaded shank portion of the screw member is formed with Acme threads.

4. An alignment positioning mechanism as set forth in claim 1 wherein said base portion of said screw member is supported on bearing means for accommodating axial rotation of said screw member on said bearing means.

5. An alignment positioning mechanism as set forth in claim 4 wherein said means for imparting axial rotation comprises a radially extending bore in said base portion of the screw member.

6. An alignment positioning mechanism as set forth in claim 4 wherein said base portion of said screw member terminates at an end surface adjacent one end of the threaded shank portion of said screw member and said end surface is provided with an annular recess in coaxial alignment with the screw member whereby said recess is adapted to collect excess lubricant which may drip or migrate thereto from the threads of said screw member or the contacting surfaces of said ball nut and ball nut housing.

7. An alignment positioning mechanism as set forth in claim 4 further including back drive prevention means on said mounting means selectively cooperable with the base portion of said screw member for preventing back drive of said screw member.

8. An alignment positioning mechanism as set forth in claim 7 wherein said back drive prevention means comprises a set screw threadedly mounted on said base portion mounting means for movement towards the base portion of said screw member to selectively engage therewith so as to prevent axial rotation of said screw member.

9. An alignment positioning mechanism for use in mounting a primary structure to another supporting structure and for correcting and compensating for relative misalignment and mispositioning of their mounting interfaces, said mechanism comprising:

an elongate screw member having a base portion and an externally threaded shank portion;

mounting means for rigidly coupling the base portion of the screw member to the mounting surface of a supporting structure with the longitudinal axis of said screw member in perpendicular relationship to the mounting interface of said supporting structure;

an annular ball nut member threadedly mounted on the threaded shank portion of said screw member whereby said ball nut member is adjustably positionable along the length of said threaded shank portion;

a ball housing enclosing said ball nut and mounted thereon for gimbal-like motion on said ball nut;

fastening means on said ball nut housing for rigidly fixing said housing to the mounting interface of a primary structure to be mounted to said support structure, said housing being gimballed on said ball nut to a position of relative inclination therewith which accommodates its connection to said mounting surface of the primary structure wherein said primary structure mounting surface is disposed in a predetermined range of angular relationships to the mounting surface of said supporting structure;

cooperative means on said ball nut and said ball nut housing for positioning said ball nut housing on said ball nut in a gimballed position; and means for imparting axial rotation to said screw member whereby said ball nut may be adjustably positioned along the threaded shank portion of said screw to accommodate engagement of said ball nut housing with said primary structure.

10. An alignment positioning mechanism as set forth in claim 9 wherein said ball nut housing is mounted on said ball nut for gimbal motion about a point coincident with the central axis of said ball nut, wherein said fastening means comprises a planar mounting interface provided on said ball nut housing which is adapted for planar engagement with the mounting interface of a structure to which it is to be mounted.

* * * * *